United States Patent [19]

Sakai

[11] 3,765,720

[45] Oct. 16, 1973

[54] POSITION ADJUSTABLE SUPPORT MECHANISM

[75] Inventor: Shoji Sakai, Kanagawa-ku, Yokohama, Japan

[73] Assignees: Nissan Motor Company, Limited; Atsugi Motor Parts Company, Limited; Ikeda Bussan Company, Limited, all of Yokohama City, Japan

[22] Filed: July 2, 1971

[21] Appl. No.: 159,328

[52] U.S. Cl. .............................................. 297/330
[51] Int. Cl. .............................................. A47s 19/00
[58] Field of Search ................... 297/330, 356, 355, 297/347, 339; 248/394, 396, 400; 5/68, 67

[56] References Cited
UNITED STATES PATENTS

| | | | |
|---|---|---|---|
| 2,582,565 | 1/1952 | Schnippel et al. .......................... | 5/68 |
| 3,477,550 | 11/1969 | Suzuki et al. ......................... | 297/355 |
| 3,604,284 | 9/1971 | Houk ..................................... | 74/491 |
| 3,338,632 | 8/1967 | Kleinsorge ........................... | 297/330 |
| 3,191,196 | 6/1965 | Holm ................................... | 297/330 |
| 3,495,869 | 2/1970 | Ingemansson ....................... | 297/330 |
| 2,839,124 | 6/1958 | Desmond et al. .................... | 297/330 |
| 3,533,658 | 10/1970 | Gropp ................................. | 297/355 |
| 3,402,408 | 9/1968 | Hutt ...................................... | 5/68 |

*Primary Examiner*—Bernard A. Gelak
*Assistant Examiner*—Garry Moore
*Attorney*—Robert E. Burns et al.

[57] ABSTRACT

Herein disclosed is a position adjustable support mechanism which is adapted to vary the height and/or inclination of a load supported on the support mechanism. The support mechanism uses a hydro-pneumatic spring which is extendable and contractable when subjected to a rotational force which is exerted thereon by rotating an operated lever. The support mechanism may be applied to an adjustable seat of a motor vehicle or an aircraft so that the seat position is varied steplessly. Where the support mechanism is combined with the adjustable seat, the support mechanism may be modified to include an additional hydro-pneumatic spring to permit the seat back to steplessly tilt relative to the seat proper.

11 Claims, 5 Drawing Figures

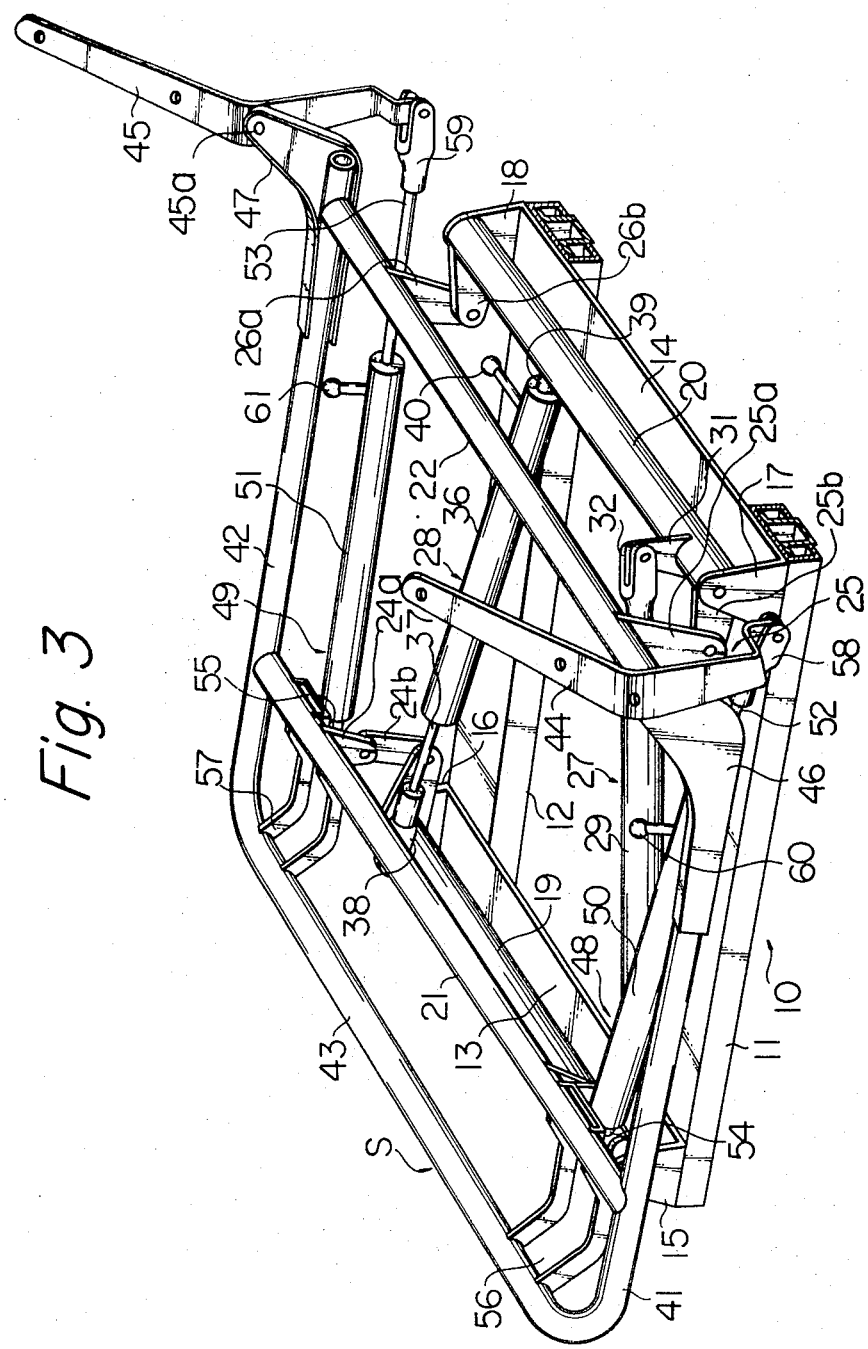

POSITION ADJUSTABLE SUPPORT MECHANISM

This invention relates generally to a support mechanism and specifically to a position adjustable support mechanism using a hydro-pneumatic spring.

An object of the invention is to provide a position adjustable support mechanism which is adapted to support a load at a desired level and/or in a desired relative position.

Another object of the invention is to provide a position adjustable support mechanism using a hydropneumatic spring by which the relative position such as the height and inclination of the load supported on the support mechanism is varied in a stepless manner.

Still another object of the invention is to provide a position adjustable support mechanism having a hydropneumatic spring which is produced during position adjusting operation of the support mechanism.

Still another object of the invention is to provide a position adjustable support mechanism having a hydropneumatic spring which is adapted to securely lock the support mechanism once the support mechanism is conditioned to provide a desired relative position of the load supported thereon and to readily unlock the support mechanism whenever it is desired to vary the relative position of such load.

The position adjustable support mechanism achieving these and other objects is generally made up of a stationary base structure to be placed on a floor, front and rear rotary shafts rotatably mounted on the base structure, a frame structure having front and rear cross members which are rigidly connected to the front and rear rotary shafts respectively, each of the cross members being raised or lowered as the associated rotary shaft is rotated in either direction, and hydropneumatic position adjusting means which is associated with the front and rear rotary shafts and the front and rear cross members of the frame structure and which has a locked condition and an unlocked condition selectively. When held in this unlocked condition, the position adjusting means is axially extendable or contractable in a fore-and-aft direction of the support mechanism for rotating the front and/or rear rotary shaft independently of each other so as to cause the front and rear cross members of the frame structure to be raised or lowered independently of each other until the position adjusting means is brought into the locked condition.

The hydro-pneumatic position adjusting means forming part of the support mechanism according to this invention may be constructed in any desired manner but may preferably comprise first and second hydro-pneumatic springs. Each of the hydro-pneumatic springs is made up of a cylinder rotatable about its axis and having closed opposite ends, a rod projecting from the cylinder and having a bifurcated end portion, a ball joint member mounted or formed at the end of the cylinder opposite to the rod, and an operating lever which is secured to the cylinder for manually rotating the cylinder about its axis. The rod of the hydro-pneumatic spring thus constructed is held stationary relative to the cylinder when the hydro-pneumatic spring is held in a locked condition and is axially extendable from or contractable into the cylinder as the cylinder is rotated in either direction about its axis independently of the rod when the hydro-pneumatic spring is held in an unlocked condition. The first hydro-pneumatic spring is pivotally connected to the rear rotary shaft through the bifurcated end portion of its rod and to a front portion of the base structure through its ball joint, while the second hydro-pneumatic spring is connected pivotally to the front rotary shaft through the bifurcated end portion of its rod and to a rear portion of the base structure through its ball joint.

The cylinder of the hydro-pneumatic spring may also be constructed and arranged in any desired manner but, in the support mechanism according to this invention, may preferably comprise a piston which is slidable in the cylinder and having formed therein a passage providing communication across the piston, a valve member mounted at an innermost end of the rod and seated on the piston, and a partition means which is axially slidably mounted in the cylinder to divide the cylinder bore into a liquid compartment filled with an incompressible liquid and a gas compartment filled with a gas under pressure such as a pressurized nitrogen gas. The piston is rotatable with the cylinder independently of the rod and the valve member is so configurated as to close or open the passage in the piston as the piston is rotated with the cylinder relative to the rod.

The position adjustable support mechanism of the above described nature will find a wide variety of practical applications insofar as the intent of holding a load at a desired level and/or in a desired relative position is maintained. A typcial and most pertinent application of the support mechanism will be an adjustable seat for use in a motor vehicle or an aircraft. It is, therefore, a further object of this invention to provide an adjustable seat using the position adjustable support mechanism of the above described character. Where the support mechanism is thus used in combination with the adjustable seat, the seat proper or seat structure is mounted on the frame structure and moved to a desired level and/or a desired relative position as the underlying frame structure is raised or lowered or inclined forwardly or backwardly depending upon the selected position of the hydro-pneumatic position adjusting means or, more specifically, upon the selected relative lengths of the hydro-pneumatic springs.

If desired, the combination of the adjustable seat and the support mechanism may include a second hydropneumatic position adjusting means by which a seat back of the adjustable seat is moved to and locked in a desired angular position relative to the frame structure of the support mechanism. In this instance, the frame structure to directly support the seat structure thereon is made up of a pair of spaced side members, a foremost lateral member secured to foremost ends of the side members and front and rear cross members secured to the side members and respectively connected to the front and rear rotary shafts through bell crank levers. Each of the front and rear cross members are raised or lowered as the associated rotary shaft is rotated in either direction, as previously noted. A pair of spaced bell crank levers having upper and lower arm portions are pivotally connected to rearmost end portions of the side members of the frame structure and are secured to the seat back through their upper arm portions. The second hydro-pneumatic position adjusting means is associated with the foremost lateral member of the frame structure and at least one of the lower arm portions of the bell crank levers. Similarly to the first hydro-pneumatic position adjusting means for varying the relative position of the seat structure, this second position adjusting means has a locked condition and an unlocked condition selectively and is extendable or contractable in the fore-and-aft direction of the support mechanism so that the bell crank levers secured to the seat back are rotated about their pivots. Causing the seat back to tilt forwardly or backwardly relative to the frame structure. This hydro-pneumatic position adjusting means may comprise an element which per se is essentially similar in construction to the hydro-pneumatic springs constituting the first hydro-pneumatic position adjusting means, thus including a rotatable cylinder, a rod projecting rearwardly from the cylinder and having a bifurcated rear end portion, a ball joint member mounted or formed at the foremost end of the cylinder. The hydro-pneumatic spring so constructed is pivotally connected to the foremost lateral member of the frame structure through the ball joint member and to the lower arm portion of the bell crank lever secured to the seat back through the bifurcated rear end portion of the rod. The rod which is held stationary when the hydro-pneumatic spring is in a locked condition is axially extendable from or contractable into the cylinder as the cylinder is rotated in either direction about its axis independently of the rod when the hydro-pneumatic spring is in an unlocked condition. The adjustable seat having the first and second position adjusting means is thus adapted not only to have its seat structure raised or lowered or inclined with respect to the base structure but to vary the angular position of the seat back relative to the seat structure. It is, in this instance, apparent that the second position adjusting means may include two substantially identical hydro-pneumatic spring which are pivotally connected to the two bell crank levers connected to the seat back.

Drawings now illustrate preferred embodiments of this invention, in which:

FIG. 3 is a view similar to FIG. 1 but shows a modification of the support mechanism;

Figure 1:
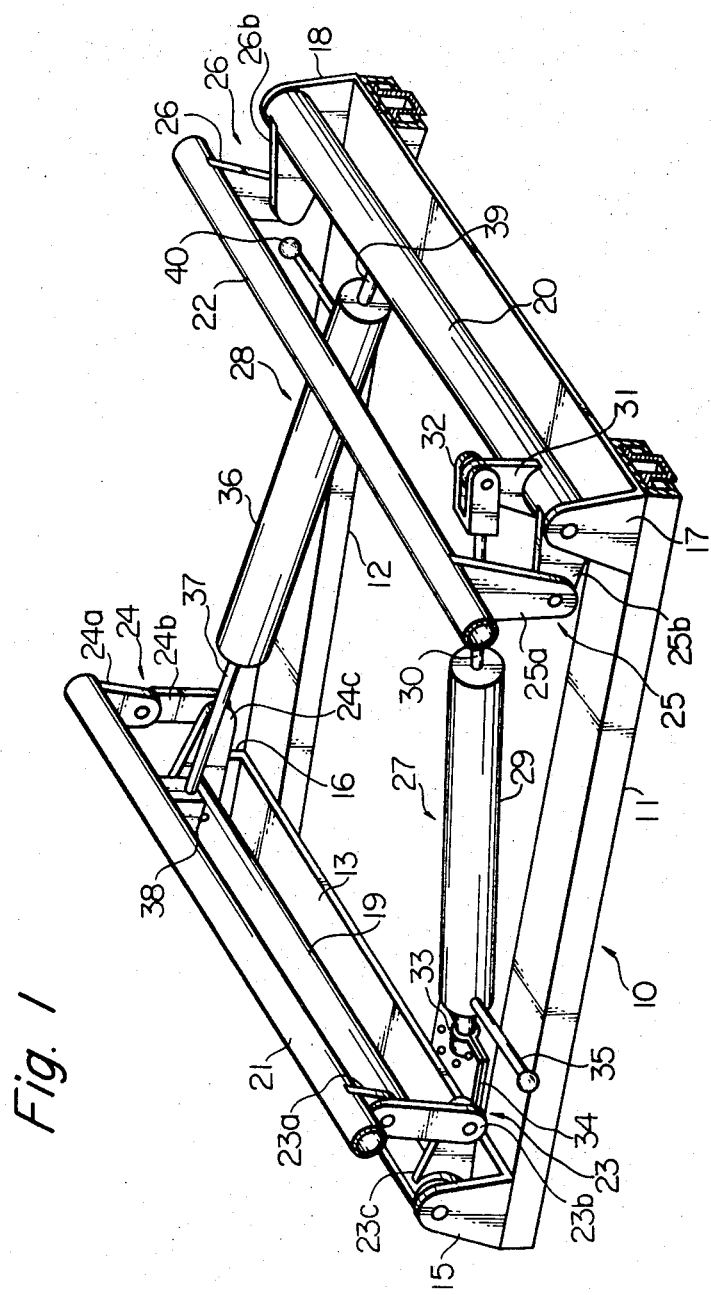
FIG. 1 is a perspective view of a position adjustable support mechanism according to this invention.

Referring to FIG. 1, the position adjustable support mechanism according to this invention is assumed to have front and rear sides (which are shown as located on the left and right sides, respectively, of the drawing), although the support mechanism can be positioned in any desired manner depending upon the application on which the support structure is placed.

The position adjustable support mechanism as shown includes a stationary base structure 10 by which the support mechanism is installed on a floor or the like. The stationary base structure 10 is largely made up of spaced side members 11 and 12 and spaced, substantially parallel front and rear cross members 13 and 14, respectively, which are mounted on the side members 11 and 12. The front and rear cross members 13 and 14 of the base structure 10 have their opposite end portions upturned to form upwardly projecting brackets 15 and 16; and 17 and 18, respectively. Spaced, substantially parallel front and rear rotary shafts 19 and 20 are pivotally connected to the front and rear cross members 13 and 14, respectively, through these brackets. As illustrated, the front rotary shaft 19 is pivotally journalled to the brackets 15 and 16 of the front cross member 13, while the rear rotary shaft 20 is pivotally journalled to the brackets 17 and 18 of the rear cross member 14.

The support mechanism further includes a frame structure by which a load to be supported by the support mechanism is carried. The frame structure comprises front and rear cross members 21 and 22 which are associated with the front and rear cross members 13 and 14, respectively, of the base structure 10. The front and rear cross members 21 and 22 of the frame structure are positioned substantially in parallel to the cross members 13 and 14, respectively, of the base structure and are rigidly connected thereto through spaced bell crank levers 23 and 24; and 25 and 26, respectively, protruding inwardly of the support mechanism. In the illustrated arrangement, the bell crank levers 23 and 24 are shown to be respectively made up of arms 23a and 24a projecting downwardly from the front cross member 21 of the frame structure, links 23b and 24b secured to and directed substantially in line with the arms 23a and 24a, and arms 23c and 24c projecting rearwardly from the front rotary shaft 19 and secured at an angle to the links 23b and 24b. The bell crank levers 25 and 26 to be positioned at the rear of the support mechanism, on the other hand, are shown as respectively comprising arms 25a and 26a projecting downwardly from the rear cross member 22 of the frame structure and arms 25b and 26b projecting forwardly from the rear rotary shaft 20 and secured at an angle to the arms 25a and 26a. The cross members 21 and 22 of the frame structure thus arranged are raised or lowered independently of each other as the front and rear rotary shafts 19 and 20 which are rotatable independently of each other are rotated in either direction. Such rotation of the rotary shafts 19 and 20 is effected manually by the aid of hydro-pneumatic position adjusting means which is associated with the rotary shafts 19 and 20 and the cross members 13 and 14 of the base structure 10. This hydro-pneumatic position adjusting means has locked and unlocked conditions selectively and is constructed in any desired manner. When held in the unlocked condition, the position adjusting means is extendable and contractable in a fore-and-aft direction of the support mechanism so that the rotary shafts 19 and 20 are accordingly rotated independently of each other.

Such hydro-pneumatic position adjusting means may include first and second, or left and right, hydro-pneumatic springs 27 and 28, respectively. The left hydro-pneumatic spring 27 includes a rotatable cylinder 29 extending generally in the fore-and-aft direction of the support mechanism, viz., substantially in parallel to the side member 11 of the base structure 10. A rod 30 projects rearwardly from the cylinder 29 and is pivotally connected to the rear rotary shaft 20. The rod 30 is held stationary relative to the cylinder 29 when the hydro-pneumatic spring 27 is in a locked condition and is axially extendable from and contractable into the cylinder 29 by rotating the cylinder 29 about its axis and relative to the rod when the hydro-pneumatic spring is in an unlocked condition, so that the rotary shaft 20 is accordingly rotated in either direction. To provide the pivotal connection between the rod 30 and the rotary shaft 20, the rotary shaft has an arm 31 projecting generally upwardly therefrom and, at the same time, the rod has a bifurcated end portion 32 which is pivotally connected to the arm 31 and which grips the arm on both sides thereof. The rod 30 connected to the rear rotary shaft 20 in this manner is permitted to rotate only about a pivot interconnecting the arm 31 and the bifurcated end portion 32 and is prevented from rotating about its own axis. At the foremost end of the cylinder 29 is mounted or formed a ball joint member 33 which is pivotally received by a suitable stationary member 34 located at the front of the support mechanism. This stationary member 34 is shown as connected to the front cross member 13 of the base member 10 by way of example.

An operating lever 35 is securely connected to the cylinder 29 in a manner to facilitate an operator to manually rotate the cylinder about its axis.

The right hydro-pneumatic spring 28 in itself is constructed to be essentially identical to the left hydro-pneumatic spring 27, including a cylinder 36 extending generally in parallel to the side member 12 and rotatable about its axis, a rod 37 having a bifurcated end portion 38 and projecting from the cylinder, and a ball joint member 39 mounted on the cylinder. Different from the left hydro-pneumatic spring 27, this spring 28 has its rod 37 projecting forwardly from the cylinder and its ball joint member 39 mounted at the rearmost end of the cylinder. The rod 37 is pivotally connected to the front rotary shaft 19 in a manner similar to the pivotal connection between the rod 30 of the left hydro-pneumatic spring 27 and the rear rotary shaft 20, though not shown in detail. Likewise, the ball joint member 39 is received by a suitable stationary member, not shown, which is fast on the rear cross member 14 of the base structure 10 for instance. The left hydro-pneumatic spring 28 is also provided with an operating lever 40 thereby to manually rotate the cylinder 36 about its axis.

When, now, the operating lever 35 of the left hydro-pneumatic spring 27 is held in a position in which the cylinder 29 causes the rod 30 to be contracted to a limit length, the rear rotary shaft 20 pivotally connected to the rod assumes an angular position in which the rear cross member 22 of the frame structure which is connected to the rotary shaft 20 by the bell orank levers 25 and 26 is held in its lowermost position.

As the operating lever 35 is manually turned to rotate the cylinder 29 about its axis, the rod 30 extends from the cylinder, turning the rear rotary shaft 20 in a direction in which the rear cross member 22 connected to the rotary shaft through the bell crank levers 25 and 26 is raised relative to the base structure 10. It should be noted in this instance that the rod 30 is prevented from rotating with the cylinder 29 due to the engagement between the bracket 31 of the rotary shaft 20 and the bifurcated end portion 32 of the rod 30. When the rear cross member 22 is raised to a desired position and the operating lever 35 is released, then the hydro-pneumatic spring 27 is locked to hold the cross member 22 stationary. The cross member 22 which is thus held in an elevated position can be lowered by turning the operating lever 35 and accordingly the cylinder 29 in an opposite direction thereby to cause the rod 30 to contract from the extended condition at desired length.

While the left hydro-pneumatic spring 27 is thus used to vary the height of the rear cross member 22 of the frame structure, the right hydro-pneumatic spring 28 is used to vary the height of the front cross member 21 of the frame structure. The operation of this right hydro-pneumatic spring 28 is apparently essentially similar to the operation of the left hydro-pneumatic spring as above described and, as such, detailed discussion thereof is herein omitted.

With the arrangement shown in FIG. 1, the front and rear cross members 21 and 22 of the frame structure can be raised or lowered independently of each other through manipulation of the operating levers 40 and 35 of the right and left hydro-pneumatic springs 27 and 28. If the cross members 21 and 22 are held at the same level, then the load supported on the frame structure will be positioned substantially in prallel to the plane of the base structure 10. If, on the contrary, either of the two cross members 21 and 22 is held higher than the other, then the load on the frame structure will be inclined with respect to the plane of the base structure. The arrangement shown is thus suited to vary not only the height of the load on the frame structure but the inclination of the load with respect to the floor on which the support mechanism is placed.

The position adjustable support mechanism having the nature above described will find a variety of practical applications in supporting a load at a desired level and in a desired relative position. A typical example of such applications is an adjustable seat for use particularly in motor vehicles and aircrafts, as previously mentioned.

Figure 2:
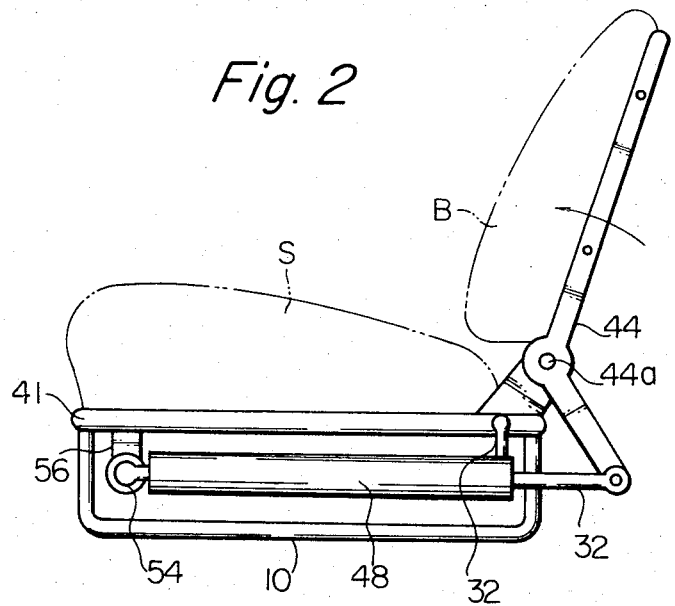
FIG. 2 is a schematic side elevational view of an adjustable seat using the support structure according to this invention.

When the support mechanism is used in combination with the adjustable seat, the seat is mounted on the frame structure including the front and rear cross members 21 and 22. The seat is thus raised or lowered or inclined forwardly or backwardly through manipulation of the operating levers 35 and 40. If desired, the support mechanism may be modified in a manner to permit the back of the seat to be tilted at a desired angle relative to the frame structure. FIGS. 2 and 3 illustrate a second preferred embodiment of this invention to achieve this purpose.

Referring to FIG. 2, the modified support mechanism is combined with an adjustable seat having a seat structure S and a seat back B. The seat structure S rests upon a frame structure of the support mechanism and is position-adjusted by an arrangement which is essentially similar to the construction shown in FIG. 1, while the seat back B is connected to the support mechanism in a manner to be tiltable forwardly or backwardly through an arrangement which is illustrated in detail in FIG. 3.

The embodiment shown in FIG. 3 thus largely comprises an arrangement adapted to vary the height and inclination of the seat structure (not shown) and an additional arrangement specifically adapted to vary the angular position of the seat back (not shown). The arrangement associated with the seat structure is essentially similar to the arrangement shown in FIG. 1 and, as such, no detailed description thereof will be herein repeated.

Referring in detail to FIG. 3, the support mechanism now includes a frame structure having a pair of spaced parallel side members 41 and 42 and a foremost lateral member 43 connected to front ends of the side members as well as the front and cross members 21 and 22 which are now shown to be connected at their opposite ends to the side members 41 and 42. A pair of forwardly vent bell crank levers 44 and 45 are pivotally connected to the side members 41 and 42 of the frame structure through brackets 46 and 47 secured to rear end portions of the side members 41 and 42, respectively. The bell crank levers 44 and 45 have rearwardly vent upper and lower arm portions (not numbered) and are mounted on the brackets 46 and 47 through pivots 44a and 45a, respectively, about which the bell crank levers are rotatable. These bell crank levers 44 and 45 are secured to the seat back B by the aid of mounting holes (not numbered) formed in the bell crank levers, as seen in FIG. 2. The seat back is thus permitted to assume different angular positions relative to the frame structure depending upon the angular position of the bell crank levers 44 and 45. The angular position of the bell crank levers 44 and 45 is varied by hydro-pneumatic position adjusting means which is associated with the bell crank levers 44 and 45 and the frame structure including the foremost lateral member 43. This position adjusting means is extendable and contractable in the fore-and-aft direction of the support mechanism and may comprise hydro-pneumatic springs which in themselves are constructed essentially similarly to the hydro-pneumatic springs 27 and 28 used in the embodiment of FIG. 1.

The hydro-pneumatic springs, designated by reference numerals 48 and 49, are thus made up respectively of rotatable cylinders 50 and 51 extending substantially in parallel to the side members 41 and 42, rods 52 and 53 projecting rearwardly from the rotatable cylinders, and ball joint members 54 and 55 mounted or formed at the foremost ends of the cylinders, similarly to the springs 27 and 28 previously described. A pair of spaced brackets 56 and 57 are mounted on the foremost lateral member 43 of the frame structure, directed rearwardly underneath the front cross member 21 of the frame structure, as shown. The ball joint members 54 and 55 of the hydro-pneumatic springs 48 and 49 are pivotally received by these brackets 56 and 57, respectively. The rods 52 and 53 of the hydro-pneumatic springs, on the other hand, are extendable from and contractable into the cylinders 50 and 51 and have formed at their rearmost ends bifurcated end portions 58 and 59, respectively, which are pivotally connected to lower arm portions of the bell crank levers 44 and 45. The bifurcated end portions 58 and 59 gripping the leading end portions of the lower arm portions of the bell crank levers 44 and 45 through their respective pivots (not numbered), the rods 52 and 53 are prevented from being rotated with the associated rotatable cylinders 50 and 51.

The cylinders 50 and 51 are provided with operating levers 60 and 61 which are so located as to be readily rotated by a seat occupant when in adjusting the relative position of the seat back.

When, now, the operating levers 60 and 61 are held in positions to hold the rods 52 and 53 in their fully extended conditions as illustrated in FIG. 3, then the lower arm portions of the bell crank levers 44 and 45 are held in their rearmost position with the result that the seat back secured to the upper arm portions of the bell crank levers are held in their upright positions, viz., forward limited positions. As the operating levers 60 and 61 are manually rotated to rotate, in turn, the cylinders 50 and 51 with the seat occupant leaning against the seat back, the rods 52 and 53 are unlocked and forced to contract into the associated cylinders 50 and 51 so that the bell crank levers 44 and 45 are rotated clockwise of the drawing about their pivots, causing the seat back to tilt rearwardly with respect to the frame structure. When a desired angular position or tilting angle is reached by the seat back and the operating levers 60 and 61 are released, then the rods 52 and 53 are locked to hold the seat back stationary in the given position. If, furthermore, the operating levers 60 and 61 are rotated to unlock the rods 52 and 53 and the seat back is released from the occupant's back, the rods are forced to extend until the seat back reaches the upright position.

Although two hydro-pneumatic springs are shown to be used for the tilting motion of the seat back in the arrangement shown in FIG. 3, such motion can be effected by the use of only one hydro-pneumatic spring which is associated with one of the side members 41 and 42 of the frame structure.

Figure 4:
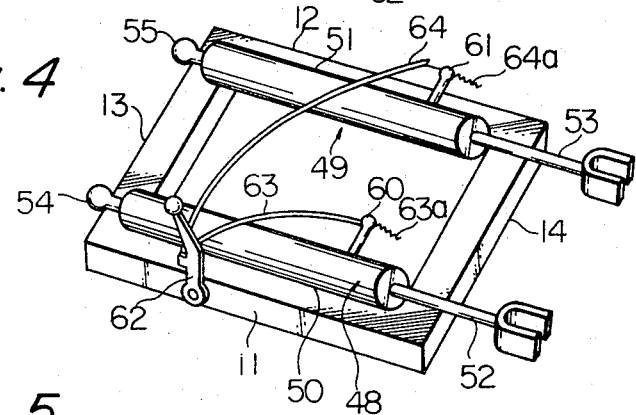
FIG. 4 is a schematic perspective view of some parts of the support structure shown in FIG. 3.

The cylinders 50 and 51 may be biased to cause the rods 52 and 53 to be unlocked and, in this instance, the operating levers 60 and 61 may be interlocked to a single main operating lever, an example of such arrangement being illustrated in FIG. 4.

As seen in FIG. 4, the cylinders 50 and 51 and the associated operating levers 60 and 61 are so arranged as to unlock the rods 52 and 53 when rotated counter clockwise when viewed from the rear of the support mechanism. The operating levers 60 and 61 are connected to a main operating lever 62 through respectively Bowden cables 63 and 64 enclosing compression springs 63a and 64a. The main operating lever 62 is secured to suitable stationary means such as for instance the base structure 10. The two operating levers 60 and 61 are thus biased by the compression springs 63a and 63b to cause the rods 52 and 53 to tend to be unlocked and are rotated in either direction through single manipulation of the main operating lever 62.

Figure 5:
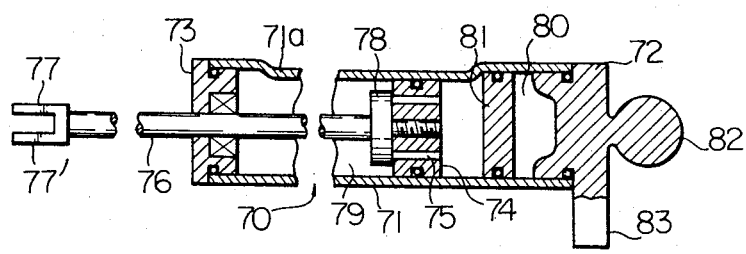
FIG. 5 is a longitudinal sectional view of a hydro-pneumatic spring applicable to the support mechanisms of FIGS. 1 and 2.

The hydro-pneumatic springs playing an important role in the position adjustable support mechanism according to this invention may be constructed in any desired manner insofar as they are capable of being locked and unlocked and are extendable and contractable by the coaction of a pressurized gas and a liquid when unlocked. A representative example of the constructions of such hydro-pneumatic springs is now illustrated in FIG. 5.

The shown hydro-pneumatic spring which is generally denoted by reference numeral 70 includes a rotatable cylinder 71, as previously described. The cylinder 71 is closed at one end by an end wall 72 and at the other end by an annular end plug 73 which is fitted within the cylinder bore. The cylinder 71 includes a piston 74 mounted in the cylinder bore and having formed therein a passage 75 providing communication across the piston 74. A piston rod 76 (corresponding to the rods 30, 37, 52 and 53 in the embodiments of FIGS. 1 and 3) projects from the piston 74, extending outwardly of the cylinder 71 through the annular end plug 73. This piston rod 76 has its inner end portion threaded to engage with an internally threaded bore in the piston 74, thereby permitting the piston to rotate relative to the piston rod 76. The piston rod 76 also has an outermost bifurcated end portion which is made up of a pair of spaced limbs 77 and 77'. A valve member 78 is mounted at the innermost end of the piston rod 76 and is seated on the piston 74. This valve member 78 is so configurated as to close or open the passage 75 in the piston 74 as the piston is rotated relative to the piston rod 76 and accordignly to the valve member 78. The piston 74 is arranged to be axially movable in the cylinder bore but is prevented from rotating about its axis by means of a suitably deformed wall portion 71a of the cylinder 71. The cylinder 71 is internally divided into two separate compartments 79 and 80 by suitable partition means which may be a floating piston 81 adapted to be axially movable in the cylinder bore. The compartment 79 defined by the annular end plug 73 and the floating piston 81 is filled with a suitable incompressible liquid. The piston 74 and the valve member 78 are accommodated in this liquid compartment. The other compartment 80 defined by the closed end wall 72 of the cylinder 71 and the floating piston 81 is filled with a gas under pressure. A ball joint member 82 is mounted on or formed at the end wall 72 of the cylinder, as illustrated. Designated by numeral 83 is an operating lever secured to the cylinder 71 for rotate the cylinder manually.

The cylinder 71 and accordingly the piston 74 are thus rotatable about their axes relative to the piston rod 76. When the cylinder 71 is in an angular position in which the valve member 78 opens the passage 75 in the piston 74, the spaces on both sides of the piston 74 in the liquid compartment 79 are permitted to communicate with each other so that the piston 74 is urged toward the annular end plug 73 by a pressure transmitted from the gas compartment 80 through the liquid in the compartment 79 existing between the piston 74 and the floating piston 81. The piston rod 76 is in this manner kept in an unlocked condition and is forced to extend outwardly through the end plug 73. When, on the other hand, the cylinder 71 and accordingly the piston 74 are rotated about their axes relative to the piston rod 76 and assume angular positions in which the passage 75 in the piston 74 is closed by the valve member 78, then the communication between the spaces on both sides of the piston 74 is blocked by the valve member 78 with the result that the piston rod 76 and accordingly the piston 74 are locked and held stationary relative to the cylinder 71.

The gas to be stored in the gas compartment 80 may preferably be a nitrogen gas for its safety in handling, reasonable cost and commercial availability as a compressed gas.

The construction of the hydro-pneumatic spring which is applicable to the position support mechanism according to this invention is not limited to the construction above described and a hydro-pneumatic spring using a rack and pinion arrangement, a mechanical stop means or a ratched mechanism may also be utilized to form the support mechanism.

The support mechanism is advantageous because the shocks and vibrations transferred to the hydro-pneumatic springs can be absorbed by the liquid stored in the cylinders of the springs and because the relative position of the load or the adjustable seat carried on the support mechanism can be steplessly varied by the co-action of the incompressible liquid and the compressible gas in the cylinder. Where, thus, the support mechanism having such advantages is used in combination with the adjustable seat of motor vehicles or aircrafts, the seat occupant is allowed to select the most comfortable position of the seat proper and the seat back simply through manipulation of the operating lever or levers and is relieved from noises resulting from the change of the position of the seat and the seat back. Since, moreover, the rod associated with the cylinder of each of the hydro-pneumatic springs is prevented from rotating about its axis even though the cylinder is rotated about its axis, the rod can be reliably held in the locked condition as long as the operating lever associated therewith is kept released so that the support mechanism in its entirety is securely held stationary once the rod is locked.

It is to be noted that the support mechanism or the adjustable seat using such support mechanism can be manufactured at a considerably low cost and fabricated in a relatively simple scheme because the hydro-pneumatic springs which form important part of the support mechanism have a common construction which is adapted to be standardized for a large-scale commercial production.

What is claimed is:

1. An adjustable seat comprising a seat rest and a seat support mechanism, said seat support mechanism comprising; a base structure; a front rotatable shaft and a rear rotatable shaft each rotatably mounted on said base structure; a frame structure supporting thereon said seat rest and having a front cross member and a rear cross member each connected to said seat rest, first connecting means connecting said front cross member to said front rotatable shaft and second connecting means connecting said rear cross member to said rear rotatable shaft, each of said cross members being raised or lowered as its associated rotatable shaft is rotated through an angular displacement; and a pair of hydro-pneumetic springs each connected to one of said rotatable shafts for angular displacement thereof, each comprising a rotatable hollow cylinder having means defining an opening in one end, a piston axially moveable in said cylinder and rotatable with said cylinder, said piston dividing said cylinder into a first compartment and a second compartment, a partition member axially slidable in said cylinder and dividing said second compartment into a first chamber and a second chamber, said first chamber containing a pressurized gas having a pressure higher than atmospheric pressure and said second chamber and said first compartment containing a liquid, means defining a passageway in said piston for providing fluid communication between said first compartment and said second chamber, a piston rod rotatably connected at one end to said piston and projecting axially therefrom and extending through said first compartment and said opening in said cylinder and connected at its other end to one of said rotatable shafts, a valve member secured to said piston rod for opening and closing said passageway, and a valve actuating means connected to an exterior surface of said cylinder for manual rotation of same and said piston relative to said valve actuating means thereby opening and closing said passageway to enable or prevent fluid communication between said second chamber and said first compartment to effect axial movement of said piston and said piston rod in said cylinder thereby effecting rotation of said rotatable shaft and adjustment of said seat rest.

2. An adjustable seat according to claim 1, wherein the end of said piston rod connected to said rotatable shaft has a bifurcated end portion for connecting said piston rod to said shaft.

3. An adjustable seat according to claim 2, wherein said connecting means connecting said front cross member and said front rotatable shaft comprises a first lever projecting outwardly from said front cross member, a second lever projecting outwardly from said front rotatable shaft, and a connecting member pivotally connected to each of said first lever and said second lever.

4. An adjustable seat according to claim 3, wherein said connecting means connecting said rear cross member and said rear rotatable shaft comprises a first lever projecting outwardly from said rear cross member and a second lever projecting outwardly from said rear rotatable shaft and pivotally secured to said first lever.

5. An adjustable seat having a seat rest, a seat back which is tiltable with respect to said seat rest and a seat support mechanism, comprising, in combination: a base structure; a front rotatable shaft and a rear rotatable shaft each rotatably mounted on said base structure; a frame structure for supporting thereon said seat rest and having a pair of spaced side members, a lateral member integral with said side members, and a front cross member and a rear cross member secured to said side members, first connecting means connecting said front cross member to said front rotatable shaft, and second connecting means connecting said rear cross member to said rear rotatable shaft, each of said cross members being raised or lowered as its associated rotatable shaft is rotated through an angular displacement; a pair of spaced bell crank levers pivotally connected respectively to said side members and having a lower arm portion and an upper arm portion secured to said seat back; a first pair of hydro-pneumatic springs each connected to one of said rotatable shafts for angular displacement thereof; and a second pair of hydro-pneumatic springs each connected to one of said lower arm portion of said bell crank levers, each of said hydro-pneumatic springs comprising a rotatable hollow cylinder having means defining an opening in one end, a piston axially movable in said cylinder and rotatable with said cylinder, said piston dividing said cylinder into a first compartment and a second compartment, a partition member axially slidable in said cylinder and dividing said second compartment into a first chamber and a second chamber, said first chamber containing a pressurized gas having a pressure higher than atmospheric pressure, and said second chamber and said first compartment containing a liquid, means defining a passageway in said piston for providing fluid communication between said first compartment and said second chamber, a piston rod rotatably connected at one end to said piston and projecting axially therefrom and extending through said first compartment and said opening in said cylinder and connected at its other end to one of said rotatable shafts, a valve member secured to said piston rod for opening and closing said passageway, and a valve actuating means connected to an exterior surface of said cylinder for manual rotation of same and said piston relative to said valve actuating means thereby opening and closing said passageway to enable or prevent fluid communciation between said second chamber and said first compartment to effect axial movement of said piston and said piston rod in said tube, and said piston rods of said first pair of hydro-pneumatic springs effects rotation of its associated rotatable shaft to adjust said seat rest and said piston rods of said second pair of hydro-pneumatic springs connected to its associated bell crank lever effects pivotal rotation of said bell crank lever to adjust said seat back.

6. An adjustable seat according to claim 5, wherein said valve actuating means of said second hydro-pneumatic springs are connected to a main operating lever by respective Bowden cables and are operated concurrently by operating said main operating lever.

7. An adjustable seat comprising: a seat rest; and a seat support mechanism supporting said seat rest and adjustable to vary the position of said seat rest relative to said support mechanism, said support mechanism comprising adjustable supporting means supporting said seat rest and actuatable to adjust the position of said seat rest, and actuating means for actuating said adjustable supporting means and comprising a turnable hollow cylinder having means defining a rod opening in one end, a piston axially movable in said cylinder and turnable therewith, said piston dividing the space within said cylinder into a first compartment and a second compartment, a partition member axially slidable in said second compartment and dividing same into a first chamber and a second chamber, said first chamber containing therein during use of the adjustable seat a pressurized gas having a pressure higher than atmospheric pressure, said first chamber and first compartment containing therein during use of the adjustable seat a liquid, means defining a passageway in said piston for providing liquid communication between said first compartment and said second chamber, a piston rod extending through said first compartment and said rod opening and connected at one end to said piston for angular displacement relative thereto and axial movement therewith, and connected at its other end to said adjustable supporting means for actuation of same when said cylinder turns a valve member secured to said piston rod and coacting therewith for opening said passageway in said piston to allow liquid to flow between said first compartment and said second chamber in response to turning of said cylinder and for closing said passageway to prevent liquid flow in response to further turning of said cylinder, and valve actuating means connected to said cylinder for turning same thereby turning said piston to a position where said valve member opens said passageway in said piston to provide liquid communication between said first compartment and said second chamber.

8. An adjustable seat according to claim 7; wherein said seat further includes an adjustable back rest, and a back rest support mechanism supporting said back rest and adjustable to vary the position of said back rest relative to said support mechanism, said support mechanism comprising adjustable supporting means supporting said back rest and actuable to adjust the position of said back rest and another actuating means alike the first mentioned actuating means defined in claim 7.

9. An adjustable seat according to claim 7; wherein said support mechanism includes a plurality of actuating means.

10. An adjustable seat according to claim 9; wherein said plurality of actuating means are each connected to a main operating lever through respective Bowden cables and are simultaneously operated by said main operating lever.

11. An adjustable seat according to claim 7; wherein said the cross-sectional area of said second compartment varies thereby limiting the distance of axial movement of said partition members.

* * * * *